US006782529B2

(12) United States Patent
Kumhyr

(10) Patent No.: US 6,782,529 B2
(45) Date of Patent: *Aug. 24, 2004

(54) METHOD, APPARATUS AND COMPUTER PROGRAM PRODUCT FOR EDITING IN A TRANSLATION VERIFICATION TEST PROCEDURE

(75) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

This patent is subject to a terminal disclaimer.

(21) Appl. No.: 09/820,466

(22) Filed: Mar. 29, 2001

(65) Prior Publication Data

US 2002/0144253 A1 Oct. 3, 2002

(51) Int. Cl.[7] .............................. G06F 9/44; G06F 15/04
(52) U.S. Cl. ....................... 717/111; 717/122; 715/511; 715/531; 715/540; 707/203
(58) Field of Search ................................ 717/110, 122, 717/168–170, 111; 715/511, 530–541; 707/8, 200–206

(56) References Cited

U.S. PATENT DOCUMENTS

| | | | | |
|---|---|---|---|---|
| 5,613,122 A | * | 3/1997 | Burnard et al. ................. | 713/1 |
| 5,664,206 A | * | 9/1997 | Murow et al. .................. | 704/8 |
| 5,835,918 A | * | 11/1998 | Walls et al. ................. | 715/513 |
| 5,974,372 A | * | 10/1999 | Barnes et al. ................... | 704/8 |
| 6,275,790 B1 | * | 8/2001 | Yamamoto et al. ............. | 704/8 |
| 6,311,151 B1 | * | 10/2001 | Yamamoto et al. ............. | 704/8 |
| 6,466,900 B1 | * | 10/2002 | Lissauer et al. ................ | 704/7 |
| 6,490,547 B1 | * | 12/2002 | Atkin et al. .................... | 704/8 |
| 6,567,973 B1 | * | 5/2003 | Yamamoto et al. ......... | 717/136 |

OTHER PUBLICATIONS

Karl Franz Fogel, "Open Source Development with CVS: Learn How to Work With Open Source Software", Oct. 1999, The Coriolis Group, 1st edition, pp. 5–61.*
Walter F. Tichy, "Design, implementation, and evaluation of a Revision Control System", 1982, Proceedings of the 6th international conference on Software engineering, IEEE Computer Society Press, pp. 58–67.*
R.L. Williamson II, "An ExpectTK/Perl Graphical User Interface to the Revision Control System (RCS)", 1997, Astronomical Society of the Pacific, ASP Conference Series, vol. 125, pp. 132–135.*
Sebastian Kremer, "An RCS Interface for GNU Emacs", 1992, Product Manual, Institute of Theoretical Physics.*
Emacs "Info" product documentation, GNU Emacs Software Product Version 20.1, The GNU Project, http://www.gnu.org, 1997, pp. 5–13.*
"Dynamic Management of Resources for Different National Languages", IBM Technical Disclosure Bulletin, Sep. 1997, vol. 40, Issue 9, pp. 171–174.*
W. F. Tichy "RCS—A System for Version Control", 1991, In Tech. Report, Dept. of Computer Science, Purdue University, pp. 1–19.*

* cited by examiner

Primary Examiner—Tuan Dam
Assistant Examiner—J. Derek Rutten
(74) Attorney, Agent, or Firm—Anthony V. S. England; Leslie A. Van Leeuwen

(57) ABSTRACT

According to one form of the invention, a display is generated for a target software program, including certain text, responsive to a user interface object. A user selection of a portion of the text for changing is accepted by an editor. The editor introspects the user interface object to find a text object having the selected text portion stored in a localization file. The editor then directs a source code version controller to check out the file and accepts a change of the text inputted by the user. The editor changes the text in the file and directs the source code version controller to check in the file with the changed text portion.

18 Claims, 3 Drawing Sheets

METHOD, APPARATUS AND COMPUTER PROGRAM PRODUCT FOR EDITING IN A TRANSLATION VERIFICATION TEST PROCEDURE

CROSS-REFERENCE TO RELATED APPLICATIONS

This application is related to the following commonly assigned U.S. patents, which are hereby incorporated herein by reference:

Yamamoto et al. "Introspective Editor System, Program, And Method For Software Translation," U.S. Pat. No. 6,275, 790, Aug. 14, 2001;

Yamamoto et al., "Introspective Editor System, Program, And Method For Software Translation Using A Facade Class," U.S. Pat. No. 6,567,973, May 20, 2003; and Yamamoto et al., "System, Program, And Method For Performing Contextual Software Translations," U.S. Pat. No. 6,311,151, Oct. 30, 2001.

This application is also related to the following commonly assigned, copending application, which is hereby incorporated herein by reference:

Yamamoto et al., "System, Program, And Method For Software Translation Using A Wrapper Class," application Ser. No. 09/362,618 filed Jul. 28, 1999.

BACKGROUND OF THE INVENTION

1. Field of the Invention

The present invention generally relates to tools for developing software for international use, and in particular to multi-language software development. More specifically, the present invention relates to performing language translation in computer software.

2. Related Art

In a Translation Verification Test ("TVT") process, a program, that is, a targeted software application, exists already that has been created in one language and then translated into a different language. Conventionally, a user sitting in front of a computer runs the translated application to verify the translation, based on their native language knowledge of the language into which the program has been translated. That is, the user executes the translated program, including interacting with it through the user interface of the program in order to exercise the various displays the program generates, to verify that the translation is grammatically and contextually proper.

Conventionally, when a word or phrase is found that needs to be changed, the user must manually find the program source code portion or file that generates the phrase or word to be changed. Even if the user finds the phrase or word, this manual method is susceptible to mistakes if the user finds the wrong instance of the phrase or word.

To address this and other problems, an Introspective Editor, which has been described in the above cross-referenced patent applications, uses introspection in the JAVA programming language to allow the user to more directly edit the displays for the target application while performing the TVT process. (JAVA is a trademark of Sun Microsystems.) According to the inventions described in those patent applications, the Introspective Editor permits the user to use a special key sequence when a word or phrase needs to be changed. The Introspective Editor then finds the correct instance in the source code that generates the word or phrase.

While the improvements provided by these inventions are extremely helpful, they still leave certain aspects of the editing process to be performed manually. In particular, they do not address certain source code control issues. Therefore a need exists for further improvements relating to the integration of the Introspective Editor into the TVT process.

SUMMARY

The foregoing need is addressed, in one form, in a method for editing text for a software program under test. It is an objective of the invention that source code version control is integrated with an editor for the TVT process. According to the method, a display is generated for a target software program, including certain text, responsive to a user interface object. A user selection of a portion of the text for changing is accepted by an editor. The editor introspects the user interface object to find a text object having the selected text portion stored in a localization file. The editor then directs a source code version controller to check out the file and accepts a change of the text inputted by the user. The editor changes the text in the file and directs the source code version controller to check in the file with the changed text portion.

In one aspect, directing the source code version controller to check out the localization file includes directing the source code version controller to a filename and path for the file.

According to another form of the invention, an apparatus for editing text for a target software program, includes a processor, a monitor connected to the processor, and a storage system connected to the processor. A certain program for controlling the processor is stored in the storage system. The processor is operative with the certain program to generate a display for the target software program on the monitor. Generating the display includes displaying text responsive to a user interface object.

The apparatus also includes a user interface device connected to the processor. The user interface device is operable with the processor and the certain program to provide a selector interface for accepting a user selection of a portion of the text displayed on the monitor for changing by the user and to provide a changer interface for accepting a change in the text portion input by the user.

The apparatus also includes a localization file stored in the storage system. The processor is operable with the certain program to find a text object, which has the selected text portion and is stored in the localization file, responsive to introspecting the user interface object. The processor is operable with the certain program to direct a source code version controller to check out the file, which the certain program changes, and to direct the source code version controller to check in the file, including the changed text portion.

In another form, a computer program product includes instructions for performing certain of the steps described herein.

It is an advantage of the invention that certain manual efforts of the user are automated by integrating source code versioning control and editing.

BRIEF DESCRIPTION OF THE DRAWINGS

Other objects and advantages of the invention will become apparent upon reading the following detailed description and upon reference to the accompanying drawings in which.

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

Figure 1:
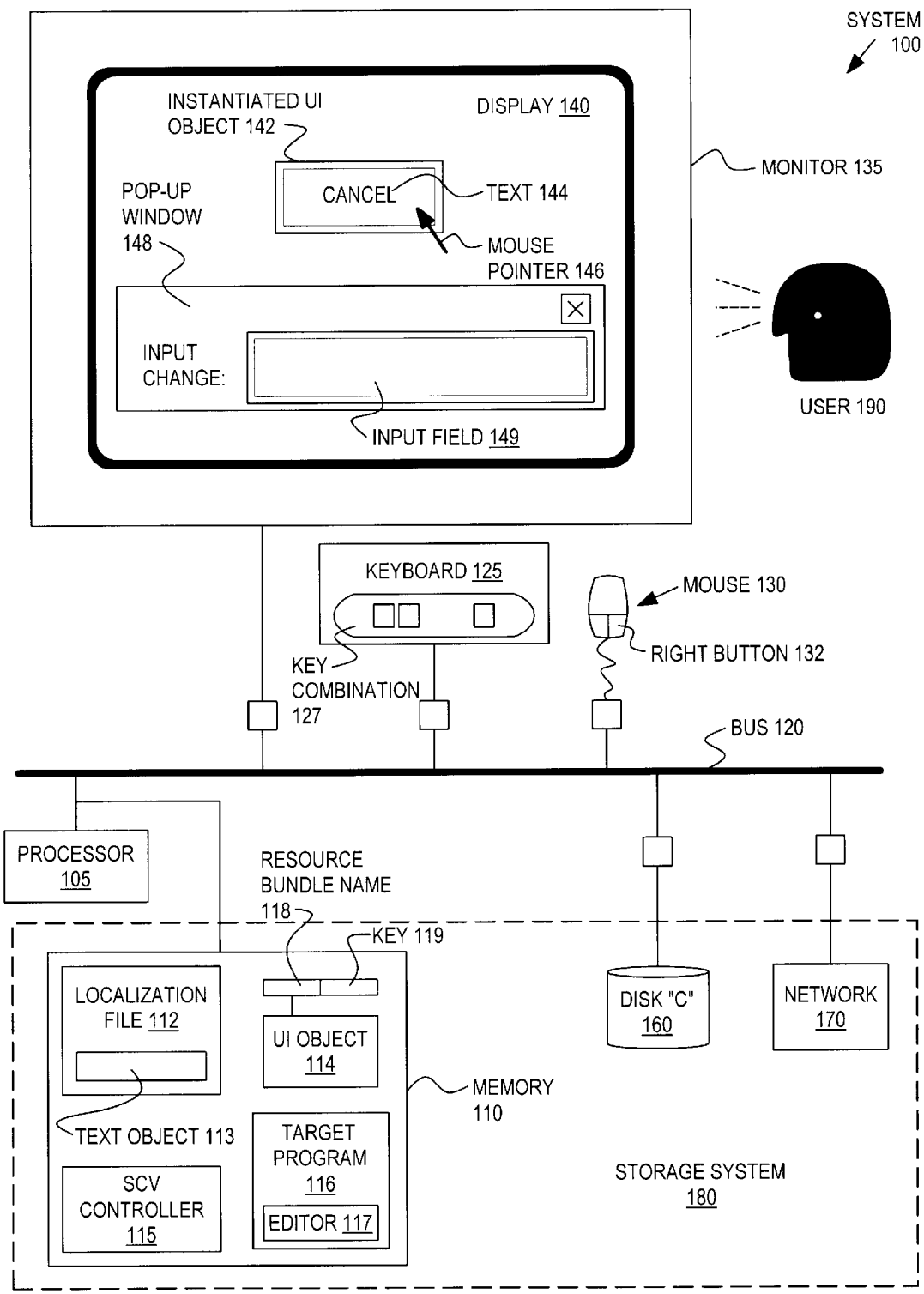
FIG. 1 illustrates a system according to an embodiment of the invention.

FIG. 1 illustrates an embodiment of the invention, according to which a computer system 100 has a processor 105, a monitor 135, a keyboard 125 and a mouse 130 coupled to a bus 120. The system 100 bus 120 is also coupled to a storage system 180, which includes a random access memory 110, a disk memory 160 and a network 170 having memory (not shown) useable for the system 100. In the illustrated embodiment, the system 100 has a program under test, that is, a target program 116 stored in memory 110, and the target program 116 includes an editor 117. In an alternative, the editor 117 may be independent of the target program 116, even to the extent that the target program 116 may be absent from the system 100. The program 116 and/or the editor 117 are operable with a processor, such as processor 105, for generating displays, among other things.

A display 140, which is illustrative of such displays, is shown on monitor 135. The generated display 140 has text 144. The text has been translated from another language, and is to be verified by a user 190, that is, a person having native language skills in the language into which the text has been translated. Alternatively, the text is not for verification, but rather is for translating by the user.

The text 144 is on an instantiated user interface object 142. That is, the processor 105 operates with a program, such as target program 116 and/or editor 117, and responsive to the user interface object 114 in memory 110 generates the display 140, which includes displaying the instantiated user interface object 142 having the text 144 which states "Cancel." The text 144 which is displayed on the object 142, which in the illustrated case is an action button, is derived from the text object 113 stored in the localization file 112 in memory 110. That is, the text object 113 has the selected text portion 144, and the displayed text 144 is generated from the text object 113.

It should be understood that the editor 117, for example, or at least a portion of the program, has been copied to memory 110 from other storage, such as disk 160, for the processor 105 to run the editor 117, so the editor is also stored elsewhere, besides the memory 110. Thus, it should be understood that any of the objects, files, programs etc. in memory 110 may also be, or alternatively be, in one or more of the other storage devices, such as disk 160, in the storage system 180, and therefore a more generalize reference is made herein to such objects, files, programs, etc. being stored in the storage system 180.

The system 100, running the target program 116 and/or the editor 117 on the processor 105, provides a selector interface for accepting a selection of the text 144 by the user 190. (It should be understood that for cases where the text 144 on the object 142 is more extensive, the user 190 may select merely a portion of the text 144.) In the embodiment, the selector interface is provided as follows. The user 190 moves the pointer 146 over the display 140, by moving the mouse 130, to point at the text 144 that the user 190 wishes to select. The user 190 then clicks the right button 132 on the mouse 130, while also pressing a combination 127 of keys on the keyboard 125. It should be understood that and alternative to a pointer device could be used, such as a trackball, touch pad, joystick or the like. Also, as an alternative to selecting by pressing a combination of keys on the keyboard 125, selecting maybe by a pressing a certain button on the pointer device.

Note that the file 112 that the text object 113 is stored in is a JAVA programing language resource bundle, as has been described in the cross referenced applications, and as is also described in "Java in a Nutshell," David Flanagan, second Edition, 1997, pages 95 through 99, and 211 through 216, which pages are herein incorporated by reference. As shown, the user interface object 114 has attached to it properties which relate to the text object 113. Specifically, properties attached to the user interface object 114 include a name of a resource bundle 118 and key 119 for the text object 113. The named resource bundle 118 contains text for messages, such as text 144, used for displays, such as display 140. The resource bundle 118 key 119 is a message name for the text 144 message.

Responsive to the user selecting the text 144, the system 100, running the editor 117 on the processor 105, introspects the user interface object 114 from which the displayed object 142 is instantiated, thereby reading the attached resource bundle name 118 and key 119. The editor 117 executes certain JAVA programming language commands using the resource bundle name 118 and key 119 in order to find the text object 113 stored in the localization file 112. More specifically, to use resources from a resource bundle, the getBundle ( ) is called to load a resource bundle. The getObject ( ) is ten used to look up resources in the resource bundle by name.

Also responsive to the user selecting the text 144, the system 100, running the target program 116 and/or the editor 117 on the processor 105, directs a source code version controller 115 that is stored in the storage system 180 to check out the file 112 having the text object 113. This includes directing the source code version controller 115 to certain information for the file 112, including a filename and path for the file 112. This may be done by the editor passing the path and filename directly to the source code version controller 115, or by the editor writing the filename and path to a configuration file (shown in FIGS. 2 through 4, and described below), which the source code version controller 115 then reads.

Figure 2:
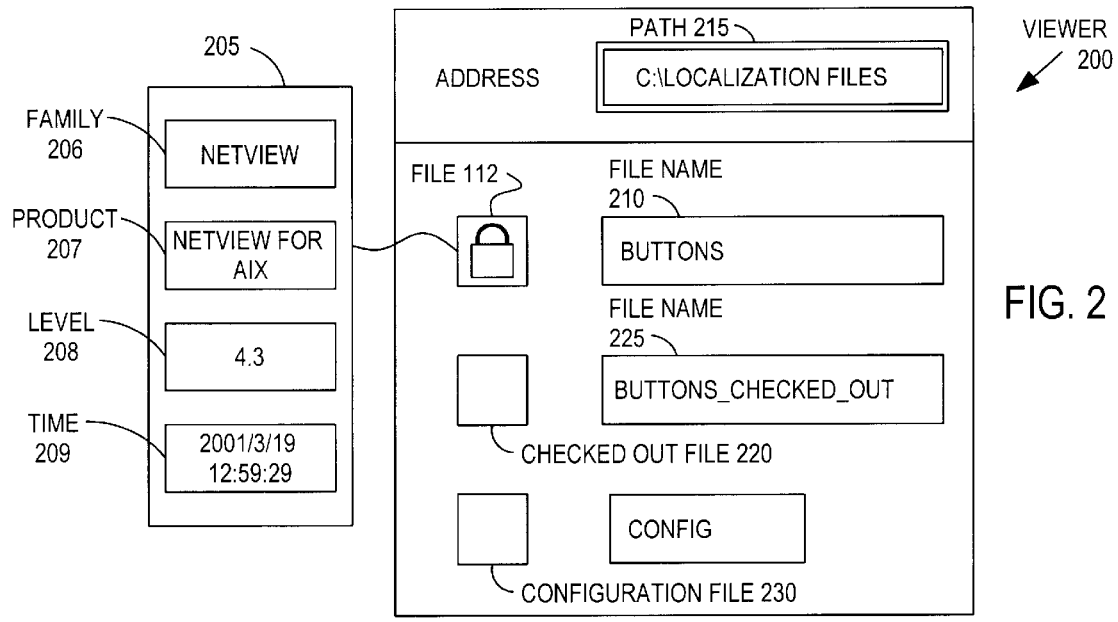
FIG. 2 shows a viewer and file properties illustrating information to which a source code version controller 115 of FIG. 1 is directed, according to an embodiment.

In FIG. 2, a viewer 200 shows a view of a portion of the disk 160, to further illustrate aspects of directing the source code version controller 115 (FIG. 1) to the filename 210 and path 215 for the file 112, and to illustrate aspects of the processing of files by the source code version controller 115. In the embodiment, the viewer 200 shows that the file name 210 for the file 112 in the embodiment is "buttons" and the localization file 112 is on the Disk "C" 160 of the host system 100 (FIG. 1) that is running the editor 117, stored under the "localization files" subdirectory, and therefore has a path 215 of "C:\localization files." The file 112 could also be on a remote host (not shown), in which case the path 215 would include the remote host name.

The file 112 icon is shown with a lock on it to illustrate that while it has the file checked out, the source code version controller locks the file 112, or at least a portion of the file, from access by others to maintain file coherency, that is, so that the file will not be changed independently by others while the user is changing it. The file 112 has associated properties 205. According to the embodiment the properties include a family name 206, product name 207, level 208 and time stamp 209, among other things. In the embodiment, the family name 206 shown is "NETVIEW," the name of a family of IBM software products. (NETVIEW is a trademark of IBM Corporation.) The product name 207 for the embodiment shown is "NETVIEW for AIX.;" (AIX is the name of a product within the IBM Netview family of software products. AIX is a trademark of IBM Corporation.) The level 208 shown is "4.3," which identifies the release level of the software. The time stamp 209 identifies the last time the file 112 was revised. Some or all of these properties are used by the source code version controller 115 (FIG. 1) in connection with checking out the file 112.

In checking out the file 112, the source code version controller creates an offspring, i.e., a checked out file 220, of the file 112. The checked out file 220, in this embodiment has a file name 225 "buttons_checked_out."

Figure 3:
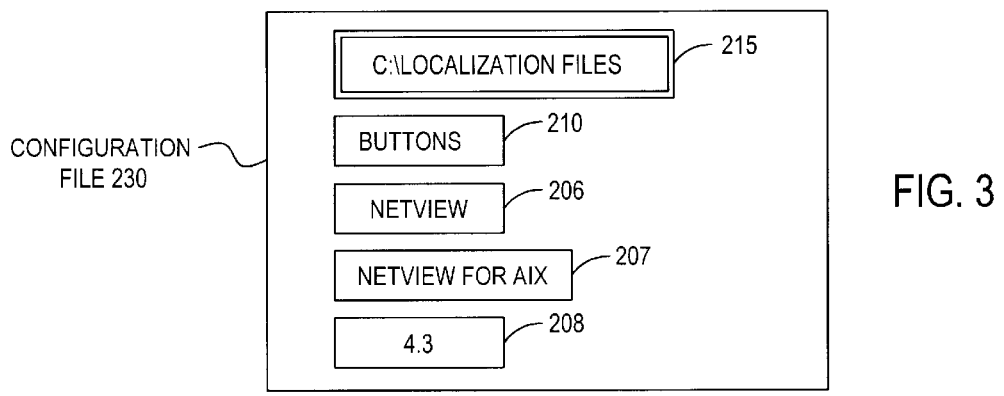
FIG. 3 illustrates the information stored in a configuration file for reading by the source code version controller, according to an embodiment.

Also, regarding the certain information for the file 112 to which the source code version controller 115 is directed, the viewer 200 shows a configuration file 230 which, according to an embodiment, has the certain information. Referring now to FIG. 3, information included in the configuration file 230 is shown, according to an embodiment. In this case, the information includes the path 215, file name 210, family name 206, product name 207 and level 208. Note that some of this information may alternatively or additionally be included in the path 215. (It should also be understood that, instead of directing the source code version controller to read the information from the configuration file the editor, the editor may pass all or some of the information shown in FIG. 3 directly to the source code version controller for the source code version controller to read.)

Referring again to FIG. 1, the system 100, running the target program 116 and/or the editor 117 on the processor 105, also provides a changer interface for accepting a change by the user 190 in the text 144 selected by the user 190. In the embodiment, the changer interface is provided as follows. Responsive to the above described selection of text 144 by the user 190, a pop-up window 148 appears over the display 140. The window 148 has a prompt, set out as "input change:" in the illustrative example, and an input field 149 in which the user 190 types the changed text using the keyboard 125 and mouse 130.

Responsive to the user 190 changing the text 144, the system 100, running the target program 116 and/or the editor 117 on the processor 105, directs the source code version controller 115 to check in the file 112, according to which the checked in file (not shown) has the changed text portion.

Figure 4:
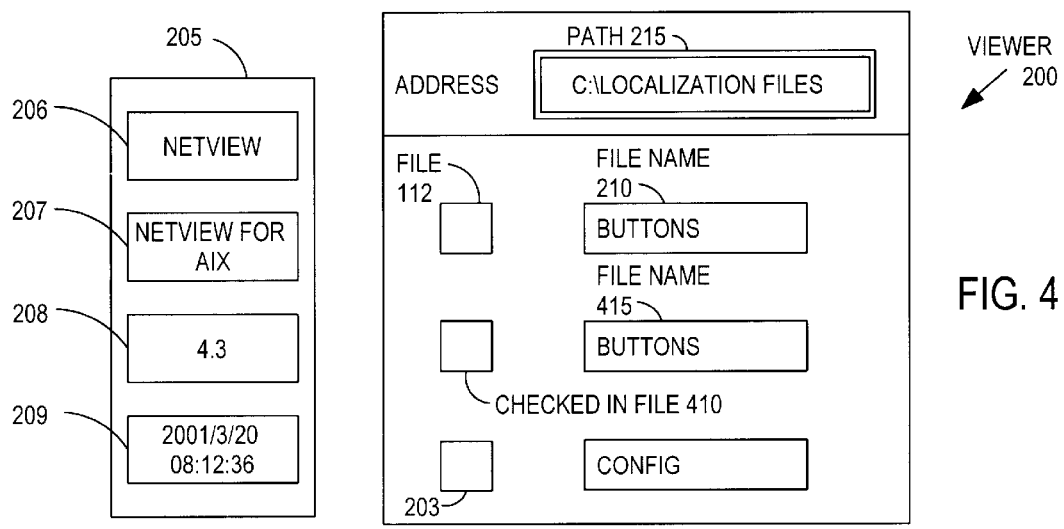
FIG. 4 shows the viewer and file properties after the source code version controller has checked in a file, according to an embodiment.

In FIG. 4, to further illustrate aspects of directing the source code version controller 115 (FIG. 1) to check out and check in the localization file 112 using the information in the configuration file 230, the viewer 200 shows a view of a portion of the local host 100 disk 160 (FIG. 1) after checking in the file 112. According to the embodiment, directing the source code version controller 115 to check out the localization file 112 includes directing the source code version controller 115 to the information in the configuration file 230 (FIG. 3). As shown, the checked in file 410 has a file name 415 "buttons" and has the same properties as the original file 112, except that the time stamp 209 is different.

Figure 5:
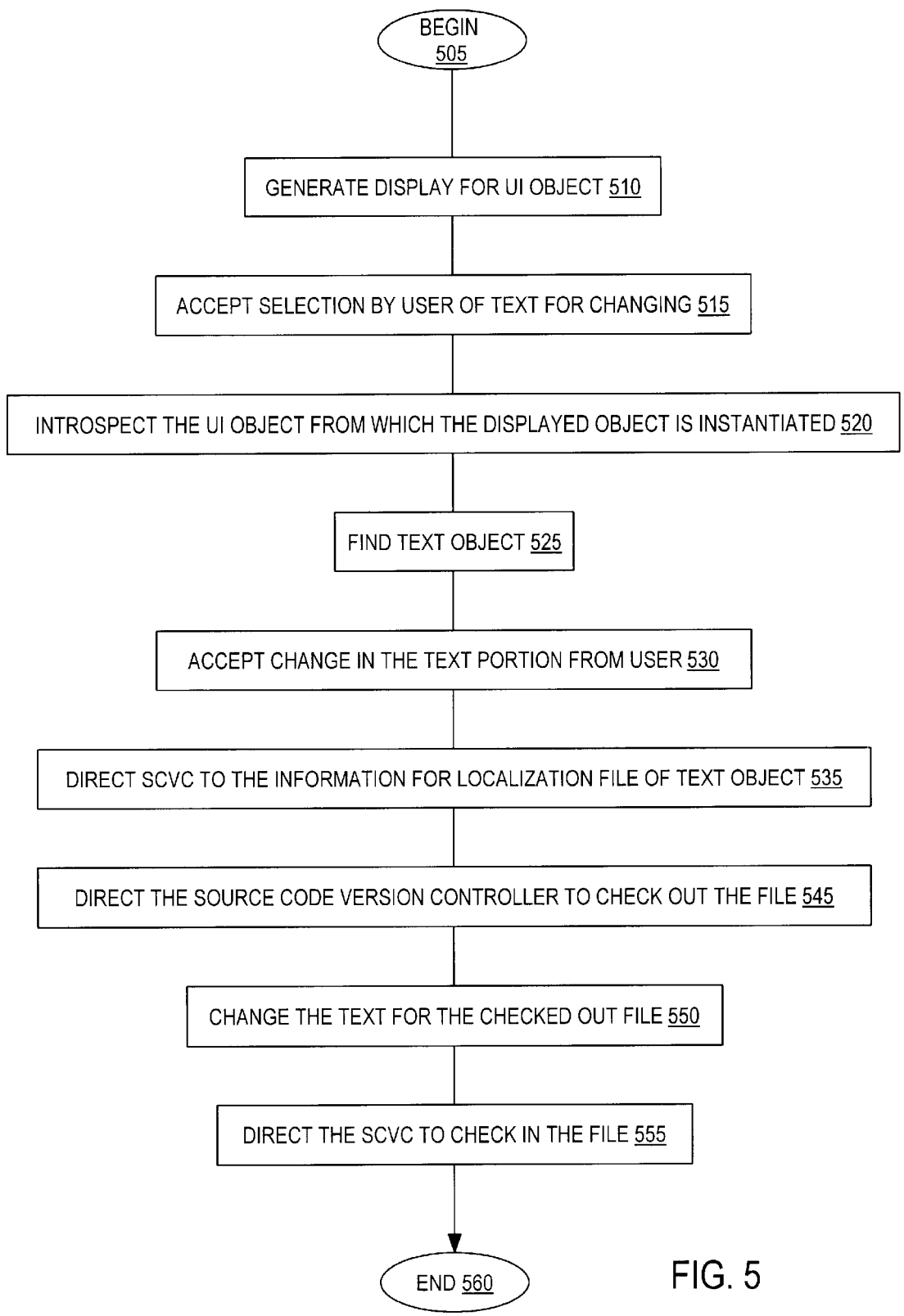
FIG. 5 illustrates an algorithm, according to an embodiment of the invention.

Referring now to FIG. 5, an algorithm is shown beginning at 505, for certain method steps according to an embodiment. At 510 a display is generated for a user interface object. Then, at 515, a selection by a user is accepted of at least a portion of text for changing by the user. (The selection is facilitated by the previously described selector interface.)

Next, at 520, the editor introspects the user interface object from which the displayed object is instantiated, and, at 525, finds the text object having the selected text portion stored in a localization file. Then, at 530, the editor accepts a change in the text portion by the user. (This is facilitated by the previously described changer interface.)

Next, at 535, the source code version controller is directed to information for the localization file, and, at 545, the source code version controller is directed to check out the file. At 550, the editor changes the text for the checked out file, and then, at 555, directs the source code version controller to check in the file which includes the changed text portion. The algorithm ends at 560, according to the embodiment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. According to this form of the invention, in one embodiment, a computer program product for editing text for a target software program, includes instructions for performing the steps described above.

It should be understood from the foregoing, that it is a particular advantage of the invention that manual efforts of the user are automated by integrating source code versioning control and editing.

The description of the present embodiment has been presented for purposes of illustration, but is not intended to be exhaustive or to limit the invention to the form disclosed. Many modifications and variations will be apparent to those of ordinary skill in the art. For example, it should be understood that while the embodiment shown in FIG. 1 shows that the target program 116 includes the editor 117, and the target program 116 generates the display 140, it would be within the spirit and scope of the invention to encompass an embodiment wherein the editor 117 runs independently of the target program 116. In this case the editor 117 instantiates the user interface object 114 which the target program 116 would use to create the display 140. In this manner the editor 117 generates a display similar to the corresponding display 140 for the target program. This alternative embodiment is explained in more detail in one of the cross-referenced applications.

Those of ordinary skill in the art will appreciate that the hardware in FIG. 1 may vary depending on the implementation. For example, other peripheral devices may be used in addition to or in place of the hardware depicted. The depicted example is not meant to imply architectural limitations with respect to the present invention. For example, the processes of the present invention may be applied to multiprocessor data processing systems.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. An apparatus for editing text in a translation verification procedure for a target software program, the apparatus comprising:
   a processor;
   a monitor connected to the processor;
   a storage system connected to the processor, wherein a target software program for controlling the processor is stored in the storage system, and wherein the processor is operative with the target software program to generate a user interface display on the monitor, the display being for the target software program, and wherein generating the display comprises displaying text responsive to a user interface object;
   a user interface device connected to the processor, wherein the user interface device is operable with the processor and the target software program to accept a selection in the user interface for the executing target software program, by a translation verification user, of a portion of the text displayed on the monitor for changing and to accept input of a change in the text portion, the change being inputted by the translation verification user while the target software program is running; and
   a localization file stored in the storage system, wherein the processor is operable with the certain program responsive to the user selection of the text to perform the steps of:
      introspecting the user interface object, wherein the text object is stored in the localization file and has the selected text portion, and the introspecting of the user interface object directs the certain program to the localization file and the text object; and
      directing a source code version controller to check out the localization file found by the introspecting and to check in the localization file, wherein the localization file is checked while the target software program is running and the checked in localization file has the changed text portion.

2. The apparatus of claim 1, wherein directing the source code version controller to check out the localization file comprises directing the source code version controller to certain information for the localization file.

3. The apparatus of claim 2, wherein the certain information comprises a filename and path for the localization file.

4. The apparatus of claim 1, wherein the target program includes an editor, and wherein the processor generates the display operating with the target program.

5. A The apparatus of claim 2, further comprising a configuration file stored in the storage system, and wherein directing the source code version controller to the certain information for the localization file comprises directing the source code version controller to read at least a portion of the certain information from the configuration file.

6. The apparatus of claim 2, further comprising an editor stored in the storage system, the processor being operative to run the editor, and wherein directing the source code version controller to the certain information for the localization file comprises the editor passing at least a portion of the certain information to the source code version controller.

7. A method for editing text in a translation verification procedure for a target software program, the method comprising the steps of:
   executing a target software program, including generating a user-interface display for the target software program, wherein generating the display includes displaying text responsive to a user interface object;
   accepting, from a translation verification user, a selection of a portion of the text for changing in the user-interface while the target software program is running;
   introspecting the user interface object responsive to the user selection of the text;
   finding a text object stored in a localization file responsive to the introspecting of the user interface object, wherein the text object has the selected text portion;
   directing a source code version controller, responsive to the user selection of the text, to check out the localization file;
   accepting a change of the at least portion of the text, the change being inputted by the translation verification user while the target software program is running; and
   directing the source code version controller to check in the localization file while the target software program is running, wherein the checked in localization file has the changed text portion.

8. The method of claim 7, wherein directing the source code version controller to check out the localization file comprises directing the source code version controller to certain information for the localization file.

9. The method of claim 8, wherein the certain information comprises a filename and path for the localization file.

10. The method of claim 8, wherein the target program includes an editor, and wherein the target program generates the display.

11. The method of claim 9, wherein directing the source code version controller to the certain information for the localization file comprises directing the source code version controller to read at least a portion of the certain information from a configuration file.

12. The method of claim 9, wherein directing the source code version controller to the certain information for the localization file comprises an editor passing at least a portion of the certain information to the source code version controller.

13. A computer program product for editing text for a target software program, the computer program product comprising:
   instructions for executing a target software program, including generating a user-interface display for the target software program, wherein generating the display includes displaying text responsive to a user interface object;

instructions for accepting, from a user, a selection in the user-interface of a portion of the text for changing while the target software program is running;

instructions for introspecting the user interface object responsive to the user selection of the text;

instructions for finding a text object stored in a localization file responsive to the introspecting of the user interface object, wherein the text object has the selected text portion;

instructions for directing a source code version controller to check out the localization file;

instructions for accepting a change of the at least portion of the text, the change being inputted by the translation verification user while the target software is running; and instructions for directing the source code version controller to check in the localization file while the target software program is running, wherein the checked in localization file has the changed text portion.

14. The computer program product of claim 13, wherein the instructions for directing the source code version controller to check out the localization file comprise instructions for directing the source code version controller to certain information for the localization file.

15. The computer program product of claim 14, wherein the certain information comprises a filename and path for the localization file 16. The computer program product of claim 13, wherein the target program includes an editor, and wherein the target program generates the display.

17. The computer program product of claim 14, wherein the instructions for directing the source code version controller to the certain information for the localization file comprise instructions for directing the source code version controller to read at least a portion of the certain information from a configuration file.

18. The computer program product of claim 14, wherein the instructions for directing the source code version controller to the certain information for the localization file comprise instructions for an editor passing at least a portion of the certain information to the source code version controller.

\* \* \* \* \*